Patented Sept. 13, 1949

2,481,676

UNITED STATES PATENT OFFICE 2,481,676

HARDENED POLYVINYL ALCOHOL SILVER HALIDE PHOTOGRAPHIC COATINGS

Wesley G. Lowe, Rochester, N. Y., assignor to Eastman Kodak Company, Rochester, N. Y., a corporation of New Jersey No Drawing. Application August 13, 1947, Serial No. 768,477

7 Claims. (Cl. 95—7)

This invention relates to the hardening of polyvinyl alcohol coatings by means of a complex made up of urea, formaldehyde and polyvinyl alcohol. This invention relates more particularly to the hardening therewith of coatings of photographic emulsions containing polyvinyl alcohol as the carrier therein.

This application is a continuation in part of my application Serial No. 497,391, filed August 4, 1943, now abandoned.

In the manufacture of photographic emulsions in which gelatin is employed as the base, it is customary in cases where the emulsion is to be subjected to hot ferrotyping or to aqueous processing solutions under warm conditions to employ hardener for the gelatin. By this hardening the sticking of the emulsion to the hot ferrotyping roll is reduced or substantially eliminated and also processing of the emulsion is facilitated.

Recently the use of polyvinyl alcohol has been suggested for photographic purposes, particularly as the carrier for the light-sensitive material. For instance, silver halide emulsions have been referred to in which polyvinyl alcohol has been employed as the protective colloid therefor. Also polyvinyl alcohol has been used for coating purposes in many instances. Although a number of hardeners have been suggested for use with polyvinyl alcohol, various disadvantages have been encountered in that use. For instance, some hardeners, while giving a suitable hardening action, have exhibited a desensitizing or fogging action upon the photographic emulsion. Other materials which do not cause desensitization have been found not to be sufficiently effective to render the polyvinyl alcohol emulsion resistant to the hot rollers commonly employed in imparting a glazed finish to photographic prints. Some of the hardeners suggested have been of a diffusible nature so that when the polyvinyl alcohol coating was applied to paper the hardener would wander into the paper so that its influence was lost. This action could be counteracted by using either a hardener having a rapid hardening action or by using a hardener that was virtually non-diffusible.

One object of my invention is to provide a hardener for polyvinyl alcohol coatings of a non-diffusible nature. Another object of my invention is to provide a hardener for hardening polyvinyl alcohol coatings which does not desensitize or fog photographic emulsions but yet is sufficiently effective to render the polyvinyl alcohol layer resistant to hot rollers. Other objects will appear herein.

I have found that hardened polyvinyl alcohol coatings may be prepared by mixing with an aqueous solution of polyvinyl alcohol a complex of urea, formaldehyde and polyvinyl alcohol, coating out the solution onto a surface and drying the coating. I have found that the action on the polyvinyl alcohol layer is not exerted until the drying operation takes place so that no increase in the viscosity of the solution used for coating is experienced. I have also found that this method is especially useful in the preparation of hardened polyvinyl alcohol photographic emulsion layers without desensitization of the photosensitive element occurring. The melting points of polyvinyl alcohol coatings prepared in accordance with my invention are raised to high temperatures in contrast to the coatings obtained from polyvinyl alcohol solutions without the use of hardener.

My invention broadly comprises the incorporation of a proportion of urea-formaldehyde-polyvinyl alcohol complex into the polyvinyl coating composition, followed by coating out of the polyvinyl coating composition onto a support and drying of the coating formed. The hardener which is added is measured in terms of formaldehyde present therein and the proportion of hardener used is within the range of 1–27% based on the polyvinyl alcohol which is present. For instance, if a batch of hardener contains 5 parts of formaldehyde and is added to an aqueous solution of polyvinyl alcohol the final solution containing 50 parts of polyvinyl alcohol, then the hardener is regarded as being present in a 10% proportion, being the proportion of formaldehyde present based on the polyvinyl alcohol in the coating composition (which includes also the polyvinyl alcohol in the hardener).

My hardener is particularly useful for forming hardened polyvinyl alcohol-silver-halide photographic emulsion layers in view of the fact that the sensitized emulsion itself will not stand prolonged heating. The hardener complex is prepared by heating the formaldehyde, urea, and polyvinyl alcohol together and then adding to the aqueous polyvinyl alcohol in the desired amount.

The hardener in accordance with my invention may be prepared by the simultaneous reaction of the three ingredients. The reaction may be carried out at the pH obtained by mixing these materials together, or it may be carried out at a pH above 7, such as imparted by the use of a small amount of ammonia or a strong amine. The complex is formed by reacting together the urea, formaldehyde and polyvinyl alcohol at an elevated temperature, such as between 50 and 100° C. and preferably between 70 and 90° C. The heating is only continued long enough to obtain some reaction of these ingredients and is carried out only for a sufficient time that the materials remain water soluble. The resulting hardener should either be employed at once or kept at a pH of at least 7 or more to assure its keeping.

The hardener employed in accordance with my invention is prepared by reacting together 0.5–1.5 parts by weight of formaldehyde, 0.5–2 parts by weight of urea and 1 to 10 parts of polyvinyl alcohol. These materials are mixed together and the amount of hardener added is figured in terms of the formaldehyde content of the composition. Very desirable proportions of these materials for use in preparing hardener are equal parts of urea and polyvinyl alcohol and an amount of formaldehyde of about 1½ parts. The preparation of the urea-formaldehyde-polyvinyl alcohol complex which is suitable for use as a hardener in accordance with our invention is illustrated herein and is also described on page 2, lines 16 to 25, of British Patent 361,910.

The speed with which the polyvinyl alcohol coating composition is hardened depends upon several factors, one of the important ones being the proportion of hardener which is used. This proportion is based on the amount of formaldehyde present in the hardening agent, compared with the amount of polyvinyl alcohol which is present in the coating composition. It is desirable for rapid hardening that at least 4% of hardener be employed in the composition although even 1% is enough in some cases. Another factor which determines the speed of hardening is the pH of the coating solution. The more acid the coating solution, the more rapid is the hardening action effected, particularly down to a pH of 3–4. Another factor which influences the speed of hardening is the concentration of the polyvinyl alcohol in the coating solution used. For instance, a 10% solution of polyvinyl alcohol upon coating out hardens more quickly than a 2% solution. Another factor which influences the rate at which the hardening occurs is the rate of drying of the polyvinyl alcohol coating. I have found that polyvinyl alcohol coatings which have been dried slowly harden at a greater rate than polyvinyl alcohol coatings which have been subjected to rapid drying. Some coatings in accordance with my invention harden within a few hours. Other coatings in accordance with my invention may harden slowly due to one or several conditions employed in their preparation and days may be required to get a coating of good resistance to water or having a high melting point.

My hardening method is especially designed for use with polyvinyl alcohol-silver-halide photographic emulsions which have been characterized heretofore by difficulty in obtaining hardened coatings. Sensitized photographic emulsions cannot be subjected to an elevated temperature without affecting their sensitization and, therefore, any hardening method involving hardening thereof by elevated temperatures is detrimental. Also, hardening methods involving the action of many hardening agents may be out of the question due to their derogatory effect on sensitized photographic emulsions. By preparing a urea-formaldehyde-polyvinyl alcohol composition at an elevated temperature initially and adding this composition to polyvinyl alcohol photographic emulsions good hardening is obtained (the time of hardening depending upon conditions) without deleteriously affecting the emulsion.

The hardener or complex of urea, formaldehyde and polyvinyl alcohol may be prepared either with or without the use of a base, such as ammonia in addition to the heating employed. The complex which is prepared when ammonia is used hardens the polyvinyl alcohol coating at either an acid or an alkaline pH, whereas the complex prepared at an acid pH, such as in the absence of ammonia or other base, will harden the polyvinyl alcohol coating only at a pH below 7. Polyvinyl alcohol coatings in which the hardener prepared at an alkaline pH is used may be set upon coating by employing boric acid (or acidulated borax) in the coating solution and subsequently fuming the layer formed therewith with gaseous $NH_3$ as described and claimed in Lowe and Griffin application, Serial No. 501,990, filed September 11, 1943, now Patent No. 2,376,371, May 22, 1945. In this way the polyvinyl alcohol coating can be set and also upon drying and ageing a hardened coating will be obtained.

I have found that incorporation of 16% of hardener in the polyvinyl alcohol coating composition can generally be depended upon to give the maximum hardening effect although in most cases lesser amounts are satisfactory. In view of the fact, however, that this hardener has very slight desensitizing action on photographic emulsions, proportions thereof greater than 16% may be employed if desired by the individual operator.

Wherever the term polyvinyl alcohol is employed herein, it refers to a partially hydrolyzed polyvinyl ester, the major portion of which is polyvinyl alcohol. For instance, commercial polyvinyl alcohol is ordinarily prepared by hydrolyzing polyvinyl acetate down to a point where a small percentage of polyvinyl acetate remains, it being impractical to completely hydrolyze the polyvinyl acetate. In some cases the amount of hydrolysis is less than in other cases but all compounds designated as polyvinyl alcohols contain more than 50% polyvinyl alcohol, and ordinarily contain 95 to 99% polyvinyl alcohol.

The following examples illustrate the preparation of hardeners and their use for hardening polyvinyl alcohol coating compositions in accordance with my invention:

*Example 1.*—45 cc. of aqueous formaldehyde of 20% concentration, 6 grams of urea, 50 cc. of an aqueous solution of polyvinyl alcohol of 12.5% concentration and 0.6 cc. of concentrated ammonium hydroxide were mixed together and heated at 90° C. for 30 minutes and the resulting solution was then adjusted to a pH of 8 and a volume of 90 cc. The solution was considered as a 10% solution of hardener (since it contains 10% formaldehyde). The resulting solution was found to be completely stable at room temperature.

*Example 2.*—A 5% solution of freshly hydrolyzed polyvinyl acetate (polyvinyl alcohol) containing 26% polyvinyl acetate, the remainder being polyvinyl alcohol (the solvent being 75% water and 25% ethyl alcohol) was adjusted to a pH of 3.5 with acetic acid. To samples of this solution were added varying amounts of urea-formaldehyde-polyvinyl alcohol complex hardener as prepared in accordance with Example 1, the proportions being figured in accordance with the amount of formaldehyde in the hardener and based on the polyvinyl alcohol (the entire hydrolyzed polyvinyl acetate) content of the coating composition. Glass plates were coated with the resulting mixture and some of the coatings or films were allowed to dry for sixteen hours at room temperature, others being allowed to dry for forty hours at room temperature. The proportions, time of drying, and the results are given in the following table:

| Per Cent of Hardener Calculated as the Per Cent of Formaldehyde Based on Total Polyvinyl Alcohol Present in the Coating Composition | Hardening Behavior | Time of Drying (Hours) |
| --- | --- | --- |
| 3.9 | Excellent | 16 |
| 7.6 | do | 16 |
| 14.4 | Some | 16 |
| .5 | Excellent | 40 |
| 1 | do | 40 |
| 2 | do | 40 |
| 2.95 | do | 40 |
| 3.9 | do | 40 |

*Example 3.*—A photographic emulsion essentially consisting of silver halide and as the vehicle therefor partially hydrolized polyvinyl acetate having a 33% polyvinyl acetate content, the remainder being polyvinyl alcohol, in suspension in a solvent consisting of 75% water and 25% ethyl alcohol, was adjusted to a pH of 4 with acetic acid. Samples of the photographic emulsion were mixed with varying amounts of the urea-formaldehyde-polyvinyl alcohol hardener and the various samples were coated on paper. The percentage of hardener used was based on the percentage of formaldehyde therein to the total hydrolyzed polyvinyl acetate referred to herein as polyvinyl alcohol in the coating composition. The coatings were dried for sixteen hours and processed in the usual manner for processing photographic emulsions. Such coatings where no hardener is used dissolve off in the wash water after fixing. The following table shows the hardening action obtained after sixteen hours drying with the various percentages of hardener.

| Per Cent of Hardener Figured as Per Cent of Formaldehyde Based on Total Polyvinyl Alcohol in the Emulsion | Processing Behavior |
| --- | --- |
| 3.9 | Image can be rubbed off. |
| 7.6 | Slight slipperiness on prolonged washing; image cannot be rubbed off. |
| 14.4 | Excellent hardening and not slippery at all. |
| 26.5 | Excellent hardening. |

*Example 4.*—A urea-formaldehyde-polyvinyl alcohol hardener was prepared by mixing in the following proportions:

12% polyvinyl alcohol (22 seconds viscosity) _____ cc__ 50
20% formaldehyde _____ cc__ 45
Urea _____ g__ 12
28% ammonia _____ cc__ 0.6

The mixture was heated for fifteen minutes at 90° C. It was then cooled and the pH was adjusted to 7.5.

*Example 5.*—A polyvinyl alcohol-silver bromide emulsion was prepared containing silver halide corresponding to 100 g. of silver nitrate and 100 g. of polyvinyl alcohol. The volume of this emulsion was 3000 cc. To this emulsion was added 50 cc. of a 4% aqueous borax solution (the pH of the borax solution was adjusted to 5.5 with acetic acid before adding). 200 cc. of the hardener prepared as described in Example 4 was added and the emulsion was coated onto a surface, fumed with gaseous ammonia to set the same, and dried by allowing to stand at room temperature. After ten days the emulsion coating was found to be insoluble in water at 80° C. The amount of hardener used in this example was 17.8% based on the formaldehyde content of the hardener and the total polyvinyl alcohol present both in the emulsion composition and the hardener. It was found that the hardener does not desensitize photographic emulsions regardless of the quantity used, thus distinguishing from the better known hardeners heretofore used for polyvinyl alcohol coating.

*Example 6.*—A hardener was prepared in the absence of ammonia (or other alkaline material) as follows: 100 cc. of 10% aqueous polyvinyl alcohol was mixed with 90 cc. of 20% formaldehyde solution and 12 g. of urea. Due to the acidity of the formaldehyde solution it was found that the pH of the mixture was 4.3. The mixture was heated for thirty minutes at 70° C. during which time the viscosity of the solution rose to three times its original value. The solution was cooled and its pH was adjusted to 8. This hardener was added to various samples of a 5% solution of high viscosity polyvinyl alcohol in various proportions, coated out on glass plates, and dried at room temperature. The coating was aged for twenty-four hours. The conditions and results obtained were as follows:

| Percent Hardener Figured as Percent Formaldehyde on Total Polyvinyl Alcohol Present | pH of Coating (Adjusted with Citric Acid) | Solubility of Coating at 80° C. |
| --- | --- | --- |
| 0 | 4.0 | Completely soluble. |
| 1% (½ cc. of hardener per 100 cc. 5% PVA). | 4.0 | Partly soluble. |
| 2% | 4.0 | Insoluble—slightly slippery. |
| 3.9% | 4.0 | Insoluble—not slippery. |
| 3.9% | 4.5 | Partly soluble. |
| 3.9% | 5.0 | Completely soluble. |

The coatings which exhibited solubility after twenty-four hours aging but which contained hardener (the latter two) were allowed to stand for a longer period whereupon hardening of the layers occurred. When the hardener is used in photographic emulsions coated onto paper, the hardening of the coatings is much slower than in coatings made on glass plates or on film. With 8–12% of hardener at a pH of 4 in polyvinyl alcohol photographic emulsions, used for coating paper, two to four weeks aging is usually desirable to reach a hardness sufficient for the paper to resist the melting action of hot ferrotyping.

The test of the effectiveness of a hardening agent for a partially hydrolyzed polyvinyl acetate or polyvinyl alcohol is the resistance of a coating thereof to hot water as compared with a check of a polyvinyl alcohol coating which has been hardened by some other means. It was observed that with polyvinyl alcohol coatings which had completed hardening in accordance with my invention the layer or coating remained in place and was resistant to softening when hot water was applied. The behavior of these coatings in the hot water test compared favorably with the best hardeners for polyvinyl alcohol coatings known at present. The time employed in preparing the hardener ordinarily should be at least fifteen minutes in order to obtain the desired complex. With temperatures in the lower portion of the range indicated, it may be desirable to use longer times such as even as much as one-half hour to an hour to obtain the most desirable effectiveness. Some cases, such as in the preparation of the compounds described in British Patent 361,910 two or three hours may even be desirable to obtain the desired hardener.

I claim:

1. A polyvinyl alcohol-silver halide photographic emulsion adapted to give coatings resistant to the softening effect of hot rolls comprising silver halide dispersed in a polyvinyl alcohol protective colloid containing therein a hardener prepared by heating together at 50–100° C. 0.5–1.5 parts of formaldehyde, 0.5–2 parts of urea, and 1–10 parts of polyvinyl alcohol, the hardener being present in the emulsion in the proportion of 1–27 parts of hardener based on the formaldehyde therein per 100 parts of polyvinyl alcohol.

2. A polyvinyl alcohol-silver halide photographic emulsion adapted to give coatings resistant to the softening effect of hot rolls comprising silver halide dispersed in a polyvinyl alcohol protective colloid containing therein a hardener prepared by heating together at 50–100° C. 1½ parts of formaldehyde, 1 part of urea, and 1 part of polyvinyl alcohol, the hardener being present in a proportion of 1–27 parts of hardener based on the formaldehyde therein per 100 parts of polyvinyl alcohol.

3. A polyvinyl alcohol-silver halide photographic emulsion adapted to give coatings resistant to the softening effect of hot rolls comprising silver halide dispersed in a polyvinyl alcohol protective colloid containing therein a hardener prepared by heating together at 70–90° C. 1½ parts of formaldehyde, 1 part of urea, and 1 part of polyvinyl alcohol in a proportion of 10 parts of hardener based on the formaldehyde therein per 100 parts of polyvinyl alcohol.

4. A method of preparing photographic products, the emulsion layer of which is resistant to the softening effect of hot rolls, which comprises preparing a photographic emulsion of a silver halide dispersed in a polyvinyl alcohol protective colloid, adding thereto a hardener prepared by heating together at 50–100° C. 0.5–1.5 parts of formaldehyde, 0.5–2 parts of urea, and 1–10 parts of polyvinyl alcohol, in a proportion of 1–27 parts of hardener based on the formaldehyde therein per 100 parts of polyvinyl alcohol present in the mixture, coating out the emulsion upon a support therefor and drying.

5. A method of preparing photographic paper, the emulsion coating of which is resistant to the softening effect of hot rolls, which comprises preparing a photographic emulsion essentially consisting of silver halide dispersed in a polyvinyl alcohol protective colloid, adding thereto a hardener prepared by heating together at 50–100° C. 0.5–1.5 parts of formaldehyde, 0.5–2 parts of urea, and 1–10 parts of polyvinyl alcohol in a proportion of 1–27 parts of hardener based on the formaldehyde therein per 100 parts of polyvinyl alcohol, coating out the emulsion as a thin layer upon a paper support therefor and drying the coating.

6. A method of preparing a photographic product, the emulsion coating of which is resistant to the softening effect of hot rolls, which comprises preparing a photographic emulsion essentially consisting of silver halide dispersed in a polyvinyl alcohol protective colloid, adding thereto a hardener prepared by heating together at 70–90° C. at a pH above 7, 1½ parts of formaldehyde, 1 part of urea, and 1 part of polyvinyl alcohol in a proportion of 10 parts of hardener based on the formaldehyde therein per 100 parts of polyvinyl alcohol, coating out the emulsion upon a carrier therefor and drying the coating at substantially room temperature.

7. A method of preparing a photographic product, the emulsion coating of which is resistant to the softening effect of hot rolls, which comprises preparing a photographic emulsion of silver halide dispersed in a polyvinyl alcohol protective colloid, incorporating therein a small proportion of boric acid, and adding thereto a hardener prepared by heating together at 50–100° C. 0.5–1.5 parts of formaldehyde, 0.5–2 parts of urea, and 1–10 parts of polyvinyl alcohol in a proportion of 1–27 parts of hardener based on the formaldehyde therein per 100 parts of polyvinyl alcohol, coating out the photographic emulsion upon a support therefor, setting the coating by fuming with gaseous ammonia, and then drying the coating.

WESLEY G. LOWE.

REFERENCES CITED

The following references are of record in the file of this patent:

UNITED STATES PATENTS

| Number | Name | Date |
|---|---|---|
| 2,184,289 | Dangelmajer | Dec. 26, 1939 |
| 2,184,310 | Meigs et al. | Dec. 26, 1939 |
| 2,286,215 | Lowe | June 16, 1942 |
| 2,376,371 | Lowe et al. | May 22, 1945 |

FOREIGN PATENTS

| Number | Country | Date |
|---|---|---|
| 361,910 | Great Britain | Nov. 16, 1931 |